(12) United States Patent
Hattori

(10) Patent No.: US 7,692,351 B2
(45) Date of Patent: Apr. 6, 2010

(54) WINDING STRUCTURE OF ROTATING ELECTRIC MACHINE

(75) Inventor: Hiroyuki Hattori, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/792,123

(22) PCT Filed: Apr. 25, 2006

(86) PCT No.: PCT/JP2006/309140

§ 371 (c)(1),
(2), (4) Date: Jun. 1, 2007

(87) PCT Pub. No.: WO2006/118297

PCT Pub. Date: Nov. 9, 2006

(65) Prior Publication Data

US 2008/0012444 A1    Jan. 17, 2008

(30) Foreign Application Priority Data

Apr. 28, 2005   (JP)   ............... 2005-131912

(51) Int. Cl.
*H02K 1/00*   (2006.01)
(52) U.S. Cl. ............... 310/198; 310/179; 310/180; 310/184
(58) Field of Classification Search ............... 310/179, 310/180, 184, 198; *H02K 1/00*
See application file for complete search history.

(56) References Cited

U.S. PATENT DOCUMENTS

| 1,711,979 | A | * | 5/1929 | Weinert | ............... | 310/202 |
| 5,661,355 | A | * | 8/1997 | Darceot | ............... | 310/180 |
| 5,934,600 | A | * | 8/1999 | Darceot | ............... | 242/433 |
| 6,844,648 | B2 | * | 1/2005 | Luttrell et al. | ............... | 310/184 |
| 2001/0010441 | A1 | * | 8/2001 | Luttrell | ............... | 310/184 |
| 2001/0033116 | A1 | * | 10/2001 | Rose, Sr. | ............... | 310/180 |
| 2002/0167242 | A1 | * | 11/2002 | Liu et al. | ............... | 310/184 |
| 2004/0061402 | A1 | | 4/2004 | Kouda et al. | | |
| 2006/0038459 | A1 | * | 2/2006 | Adaniya et al. | ............... | 310/180 |

FOREIGN PATENT DOCUMENTS

| JP | A 3-178536 | 8/1991 |
| JP | A 2000-217290 | 8/2000 |

* cited by examiner

*Primary Examiner*—Quyen Leung
*Assistant Examiner*—John K Kim
(74) *Attorney, Agent, or Firm*—Oliff & Berridge, PLC

(57) ABSTRACT

A stator winding has series coils and the series coils are connected in parallel. One of the series coil includes series-connected U phase coils and the other series coil includes series-connected U phase coils. A part of a wire connecting U phase coils of that one series coil is wound around the same teeth as those around which one of the U phase coils of the other series coil is wound, so as to form a U phase coil. A part of a wire connecting U phase coils of the other series coil is wound around the same teeth as those around which one of the phase coils of that one series coil is wound, so as to form a U phase coil.

4 Claims, 9 Drawing Sheets

WINDING STRUCTURE OF ROTATING ELECTRIC MACHINE

TECHNICAL FIELD

The present invention relates to a winding structure of a rotating electric machine. In particular, the invention relates to a winding structure of a rotating electric machine having a core body and a winding portion.

BACKGROUND ART

Conventional winding structures of a rotating electric machine are for example disclosed in Japanese Patent Laying-Open Nos. 2000-217290 and 03-178536.

Japanese Patent Laying-Open No. 2000-217290 discloses an electric motor in which windings of each phase are connected in the manner that windings opposite to each other in the radial direction are connected in parallel and a set of thus parallel-connected windings is connected in series with another set of parallel-connected windings.

Japanese Patent Laying-Open No. 03-178536 discloses a connection method for windings of a rotating electric machine, connecting parallel circuits each comprised of two series circuits.

In some cases, a rotor and a stator of a rotating electric machine are disposed eccentrically with respect to each other, namely respective centers of the rotor and the stator do not coincide. Here, in a winding structure in which series-connected coils are connected in parallel with another series-connected coils (like the winding structure disclosed in Japanese Patent Laying-Open No. 03-178536 for example), imbalance in electromotive force due to the eccentricity could generate cyclic current in the parallel circuit to accordingly cause increases of vibrations and noise of the rotating electric machine while it is driven.

However, in the case where parallel circuits are formed for each coil as disclosed in Japanese Patent Laying-Open No. 2000-217290, the coil-to-coil wire providing connection between coils is longer. Accordingly, the coil end increases in size.

DISCLOSURE OF THE INVENTION

An object of the present invention is to provide a downsized winding structure of a rotating electric machine and to suppress vibrations and noise that could occur while the rotating electric machine is driven.

According to the present invention, a winding structure of a rotating electric machine includes a core body having teeth and a winding portion wound around the teeth of the core body. The winding portion has a first coil group and a second coil group. The first coil group and the second coil group are connected in parallel. The first coil group includes a plurality of first coils connected in series. The second coil group includes a plurality of second coils connected in series. A part of a wire connecting a plurality of the first coils to each other is wound around the same teeth as those around which one of the second coils is wound.

In the above-described structure, a part of the wire connecting a plurality of coils included in the first coil group is wound around the teeth to form a part of a coil. Accordingly, the coil-to-coil wire connecting a plurality of coils to each other is shortened and thus the coil end is reduced in size. Here, since the part of the coil-to-coil wire is wound around the same teeth as those around which the second coil is wound, the part of the wire can contribute, together with the second coil, to the electromotive force.

Preferably, in the winding structure of a rotating electric machine, the number of turns of the part of the wire wound around the same teeth as those around which the second coil is wound is at most the number of turns of the second coil wound around the teeth.

Thus, the winding structure can be reduced in size while suppressing deterioration in electromagnetic balance of the winding structure and vibrations and noise, that could occur while the rotating electric machine is driven, are suppressed.

Preferably, the winding structure of a rotating electric machine includes the winding portion of a plurality of phases formed with displacement therebetween in the circumferential direction of the core body.

Thus, a winding structure of a rotating electric machine having multiple phases can be provided.

In accordance with the present invention as described above, the winding structure of the rotating electric machine can be reduced in size.

BEST MODES FOR CARRYING OUT THE INVENTION

Figure 1:
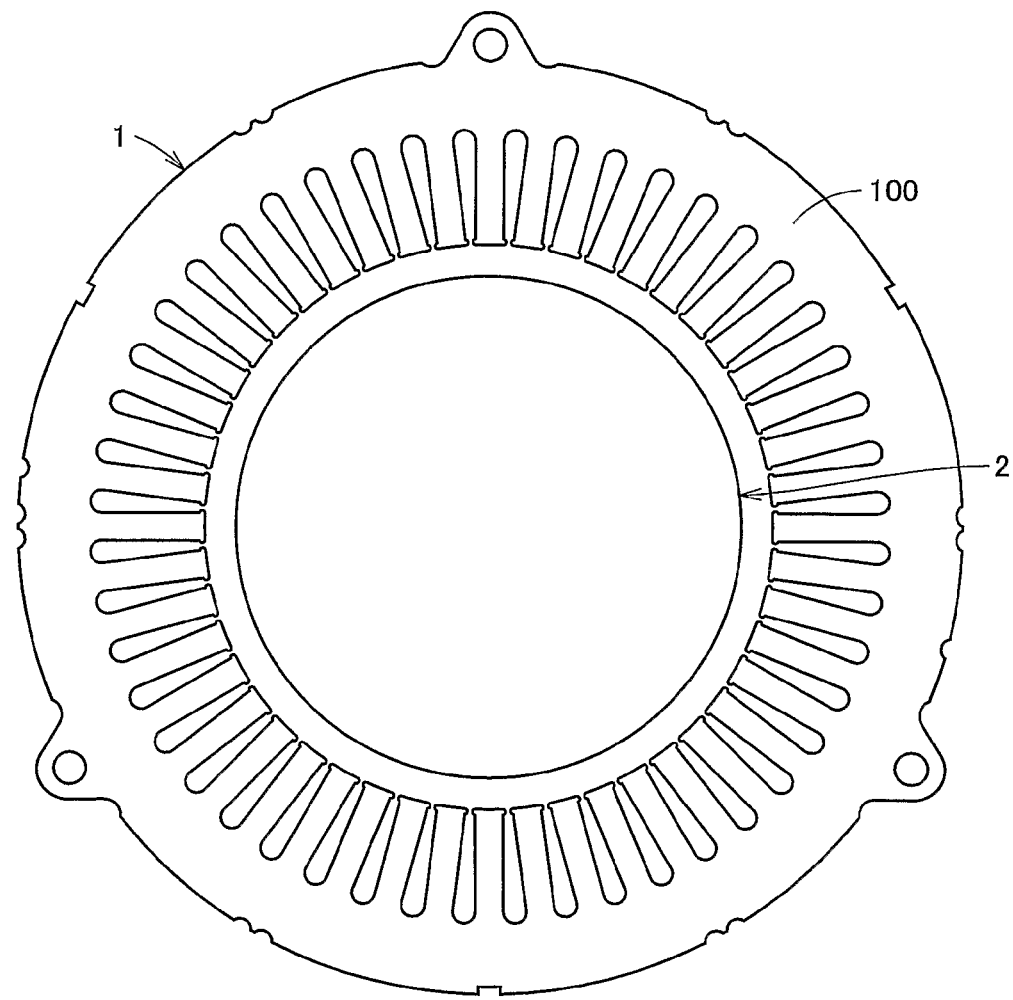
FIG. 1 is an axial cross-sectional view showing a rotating electric machine having a winding structure according to an embodiment of the present invention.

In the following, a description is given of an embodiment of a winding structure of a rotating electric machine according to the present invention. It is noted that like or corresponding components are denoted by like reference characters and a description thereof may not be repeated depending on the case.

FIG. 1 is an axial cross-sectional view showing a rotating electric machine having a winding structure according to an embodiment of the present invention. Referring to FIG. 1, the rotating electric machine includes a stator 1 and a rotor 2.

Stator 1 includes a stator core 100 corresponding to "core body" and a stator winding (not shown in FIG. 1) wound around stator core 100.

Figure 2:
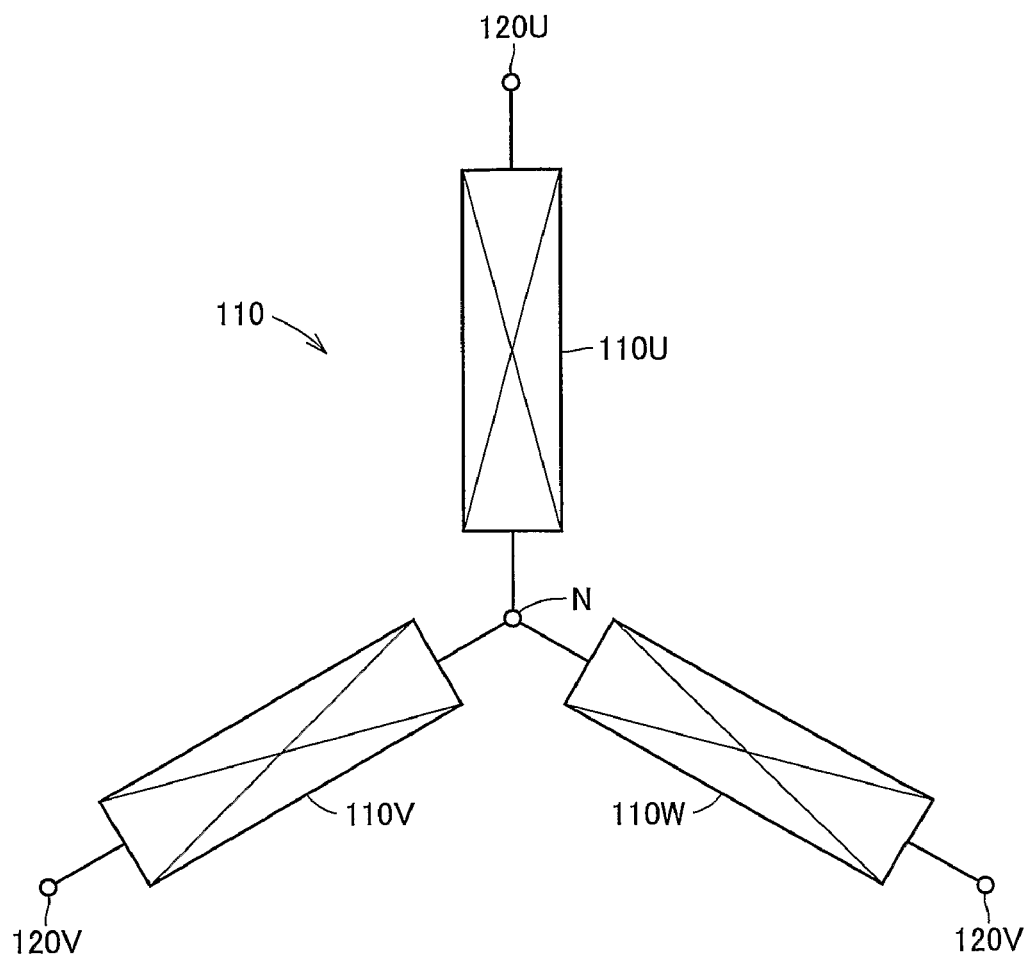
FIG. 2 shows the winding structure according to the embodiment of the present invention.

FIG. 2 shows a stator winding structure of the rotating electric machine shown in FIG. 1. Referring to FIG. 2, a stator winding 110 corresponding to "winding portion" includes a U phase coil 110U, a V phase coil 110V and a W phase coil 110W. Respective one ends of phase coils 110U, 110V and 110W are respectively a U phase terminal 120U, a V phase terminal 120V and a W phase terminal 120W that are connected to respective corresponding phases of a feeding cable that is a three-phase cable. Respective other ends of phase coils 110U, 110V and 110W are connected at a common point, namely a neutral point N.

Figure 3:
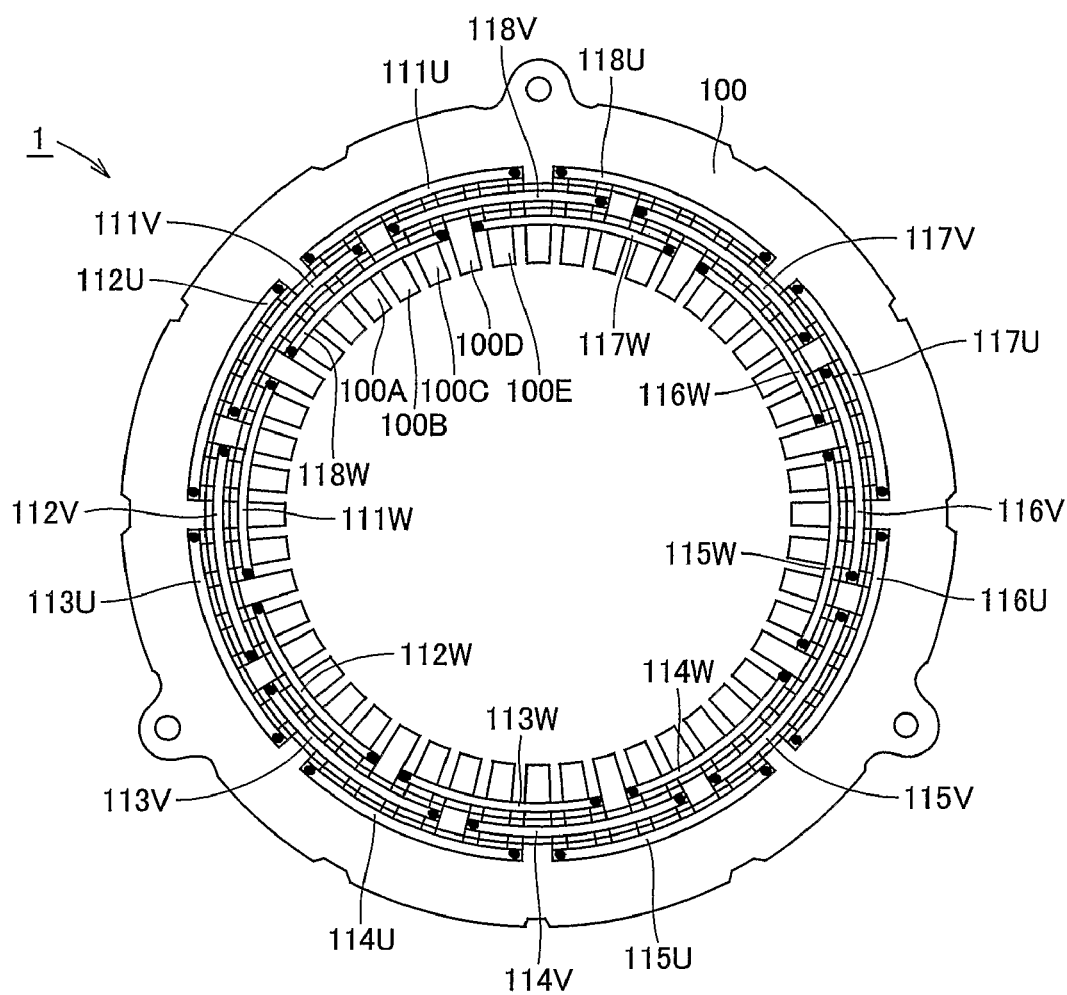
FIG. 3 is a top view showing a stator having the winding structure according to the embodiment of the present invention.

FIG. 3 is a top view showing stator 1 having the winding structure shown FIG. 2. Referring to FIG. 3, stator core 100 is a hollow cylinder in shape and has 48 teeth (teeth 110A-110E for example) arranged on its inner peripheral surface in the circumferential direction. U phase coil 110U (FIG. 2) is comprised of U phase coils 111U to 118U, V phase coil 110V (FIG. 2) is comprised of V phase coils 111V to 118V and W phase coil 110W (FIG. 2) is comprised of W phase coils 111W to 118W. Phase coils 111U to 118U, 111V to 118V and 111W to 118W are each substantially in the shape of a circular arc. U phase coils 111U to 118U are arranged as radially outermost coils. V phase coils 111V to 118V are arranged on the inside of U phase coils 111U to 118U and at a certain distance in the circumferential direction with respect to U phase coils 111U to 118U. W phase coils 111W to 118W are arranged on the inside of V phase coils 111V to 118V and at a certain distance in the circumferential direction with respect to V phase coils 111V to 118V.

Each of phase coils 111U to 118U, 111V to 118V and 111W to 118W is wound around a plurality of corresponding teeth. For example, U phase coil 111U is formed by being wound a predetermined number of times around corresponding teeth 100A to 100E.

Other coils 112U to 118U, 111V to 118V and 111W to 118W are each also wound around corresponding teeth and thus formed similarly to U phase coil 111U.

Each phase coil is wound in the direction opposite to the direction in which an adjacent coil of the same phase is wound. For example, U phase coil 111U is wound in the direction opposite to the direction in which U phase coil 118U is wound, and U phase coil 112U is wound in the direction opposite to the direction in which U phase coil 111U is wound, namely in the same direction as the direction in which U phase coil 118U is wound. Here, it is supposed that the direction in which U phase coil 111U is wound is "first direction" and the direction in which U phase coil 112U is wound is "second direction." Then, U phase coils 111U, 113U, 115U, 117U are wound in the "first direction" and U phase coils 112U, 114U, 116U, 118U are wound in the "second direction."

Figure 4:
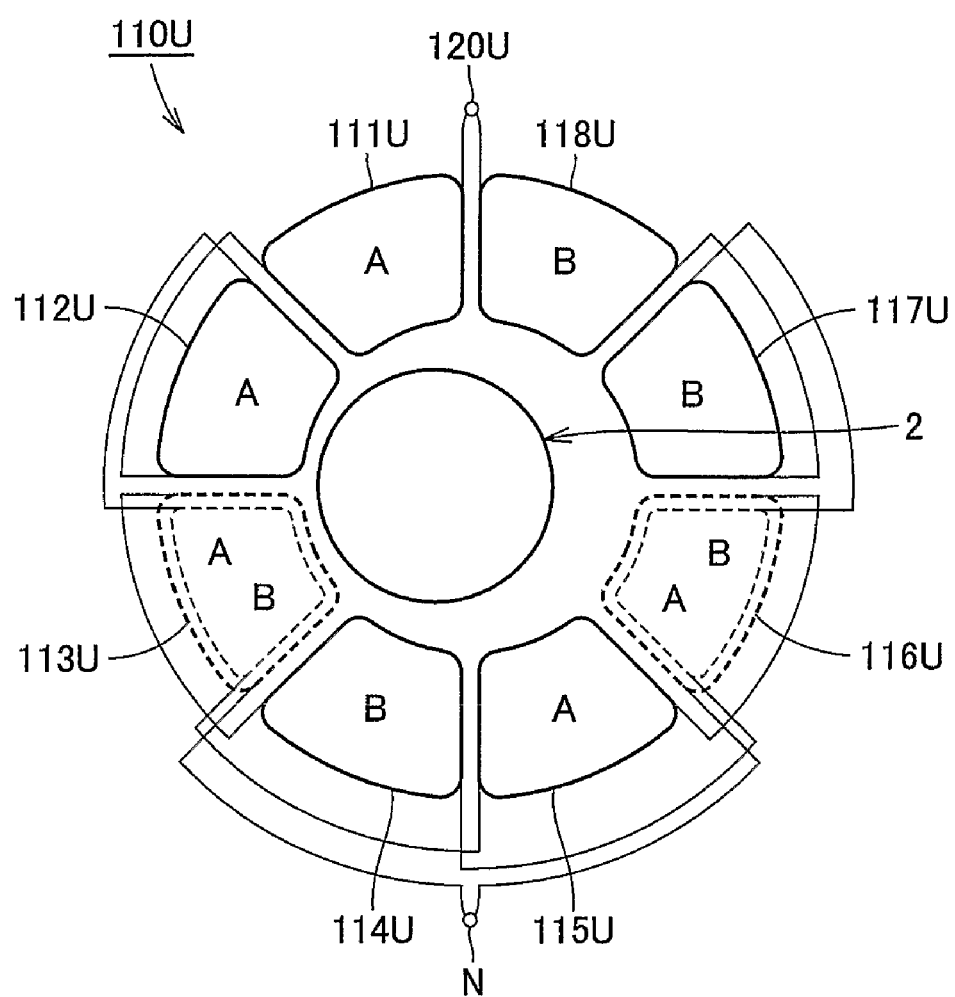
FIG. 4 schematically shows details of a winding structure according to the embodiment of the present invention.
Figure 5:
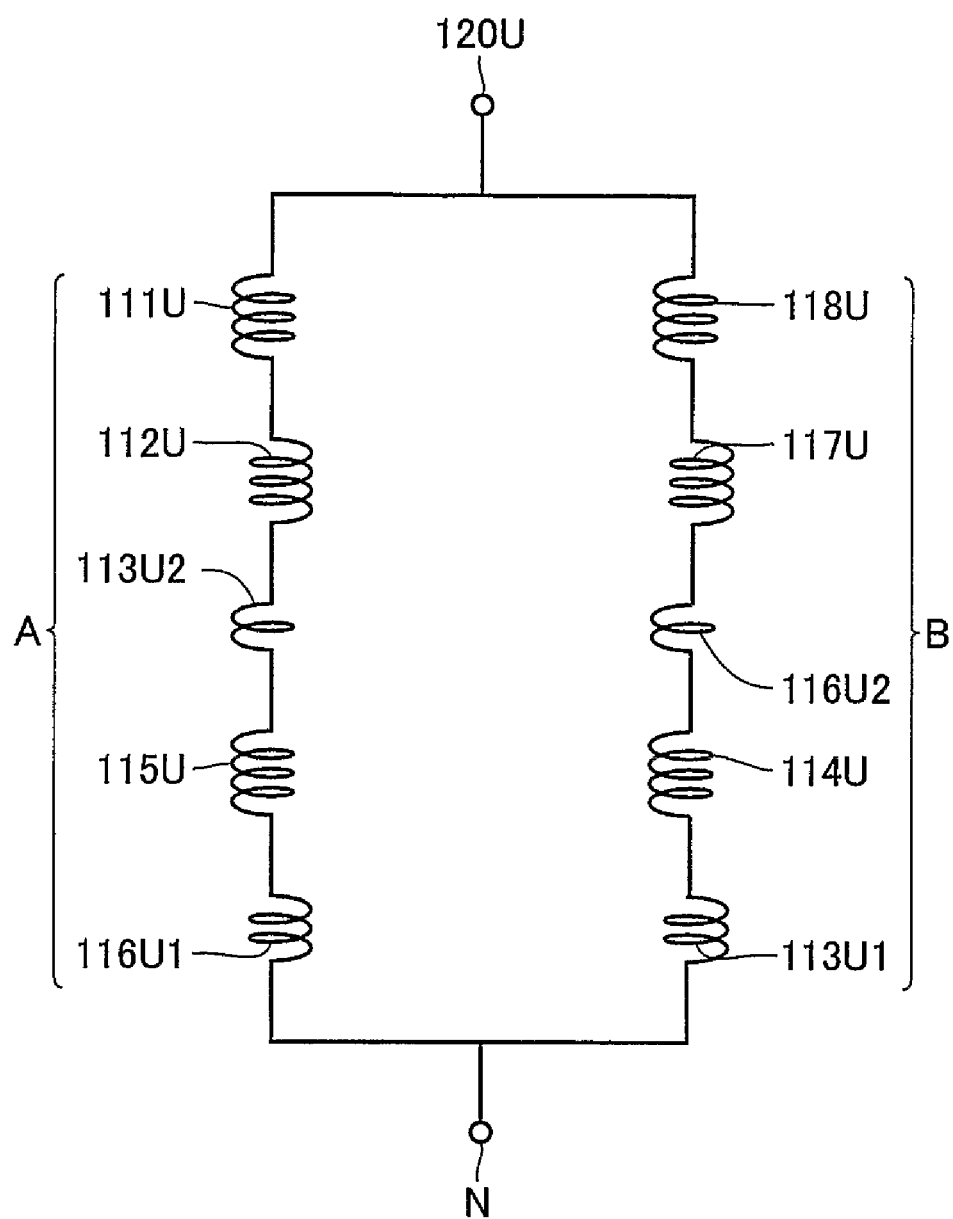
FIG. 5 is an equivalent circuit diagram showing the winding structure in FIG. 4.
Figure 6:
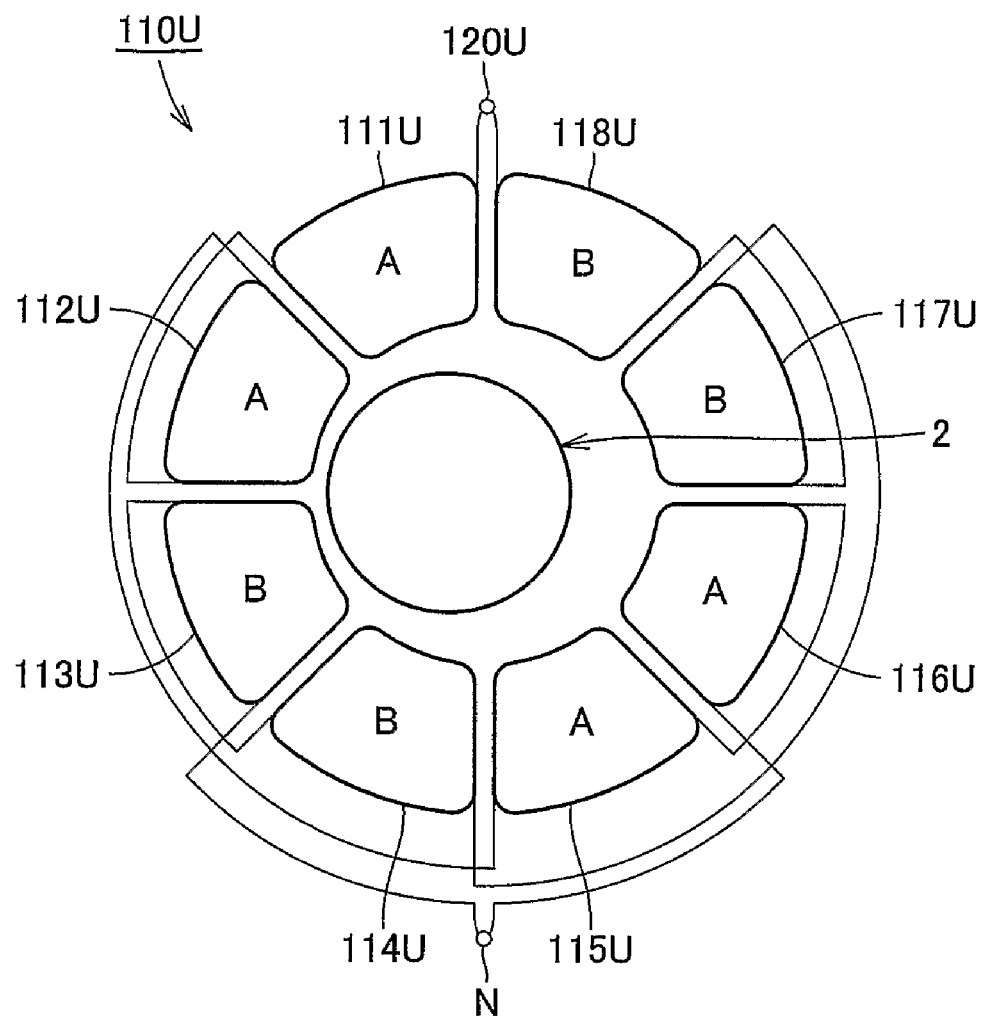
FIG. 6 schematically shows details of a winding structure to be compared with the winding structure shown in FIG. 4.
Figure 7:
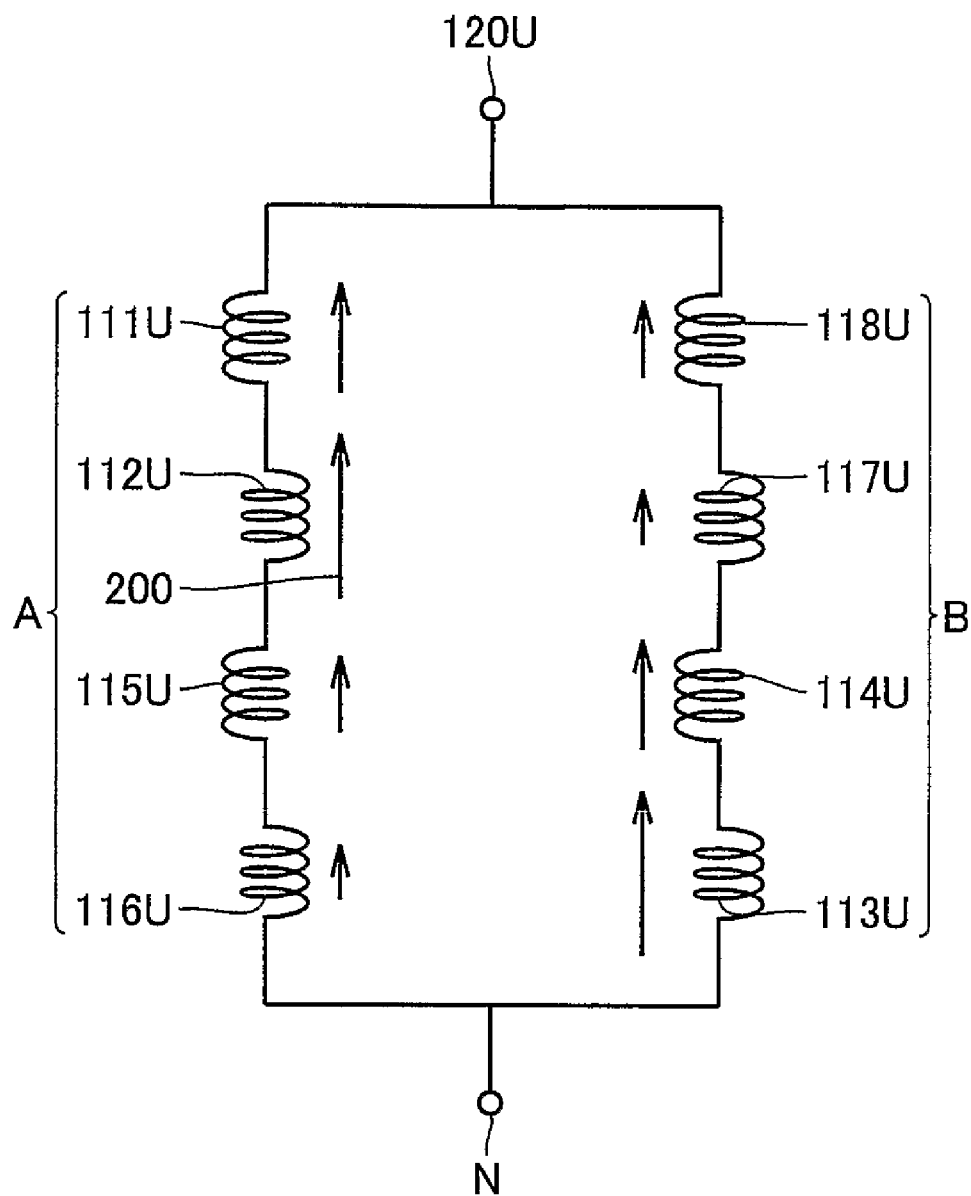
FIG. 7 is an equivalent circuit diagram showing the winding structure in FIG. 6.

FIG. 4 schematically shows a winding structure including U phase coils 111U to 118U. FIG. 5 is an equivalent circuit diagram showing the winding structure in FIG. 4. In contrast, FIG. 6 schematically shows a winding structure to be compared with the winding structure shown in FIG. 4. FIG. 7 is an equivalent circuit diagram showing the winding structure in FIG. 6.

Referring to FIGS. 6 and 7, U phase coils 111U, 112U, 115U, 116U that are a plurality of "first coils" constituting a "first coil group (series coil A)" are connected in series, with one end indicated as a U phase terminal 120U and the other end indicated as a neutral point N. U phase coils 113U, 114U, 117U, 118U that are a plurality of "second coils" constituting a "second coil group (series coil B)" are connected in series, with one end indicated as U phase terminal 120U and the other end indicated as neutral point N. Specifically, in the winding structure shown in FIGS. 6 and 7, a group of a plurality of series-connected coils, namely U phase coils 111U, 112U, 115U, 116U (series coil A) and another group of a plurality of series-connected coils, namely U phase coils 113U, 114U, 117U, 118U (series coil B) are connected in parallel.

As shown in FIG. 6, U phase coils 111U, 112U, 115U, 116U belonging to "series coil A" are arranged in the manner that one set of coils and the other set of coils of these U phase coils are spaced apart from each other in the circumferential direction of stator core 100 while opposite to each other in the radial direction of stator core 100. More specifically, one set of U phase coils 111U, 112U and the other set of U phase coils 115U, 116U are formed to be apart from each other by 180° in the circumferential direction of stator core 100.

U phase coils 113U, 114U, 117U, 118U belonging to "series coil B" are arranged in the manner that one set of coils and the other set of coils of these U phase coils are spaced apart from each other in the circumferential direction of stator core 100 while opposite to each other in the radial direction of stator core 100. More specifically, one set of U phase coils 113U, 114U and the other set of U phase coils 117U, 118U are formed to be apart from each other by 180° in the circumferential direction of stator core 100.

Figure 8:
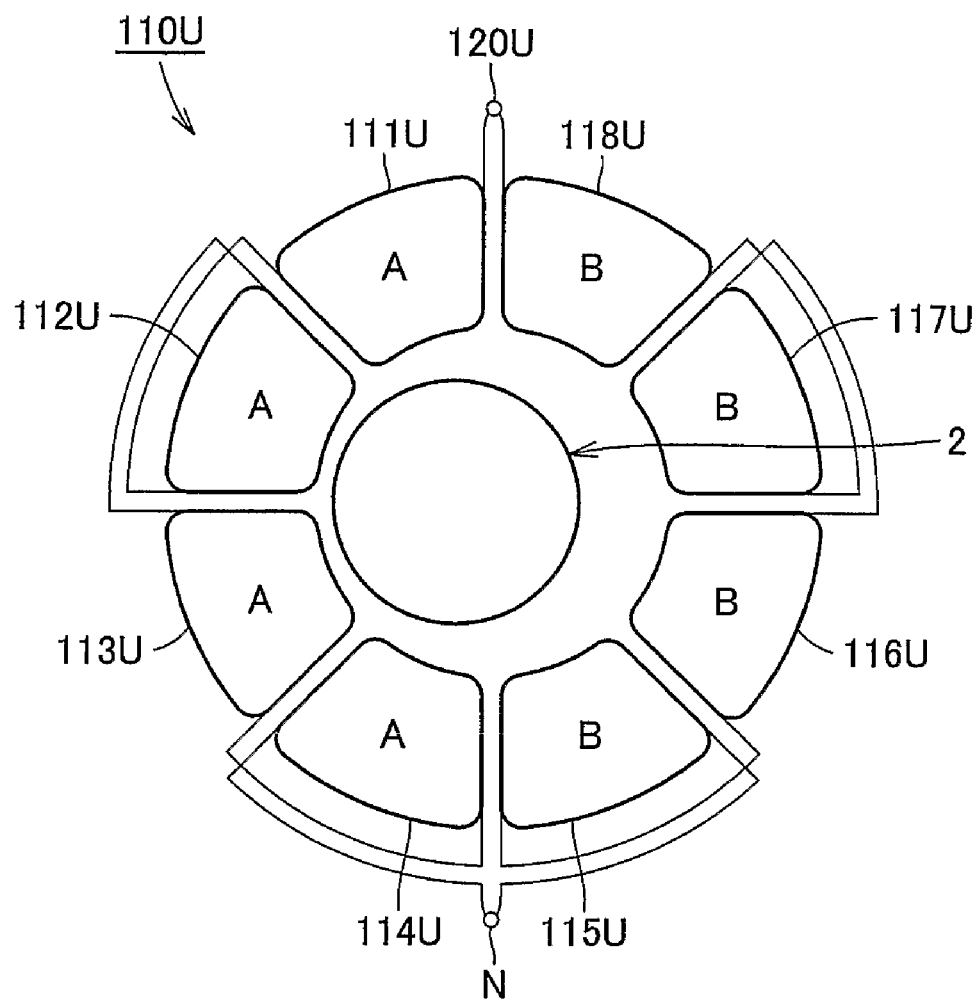
FIG. 8 schematically shows details of another winding structure to be compared with the winding structure shown in FIG. 4.
Figure 9:
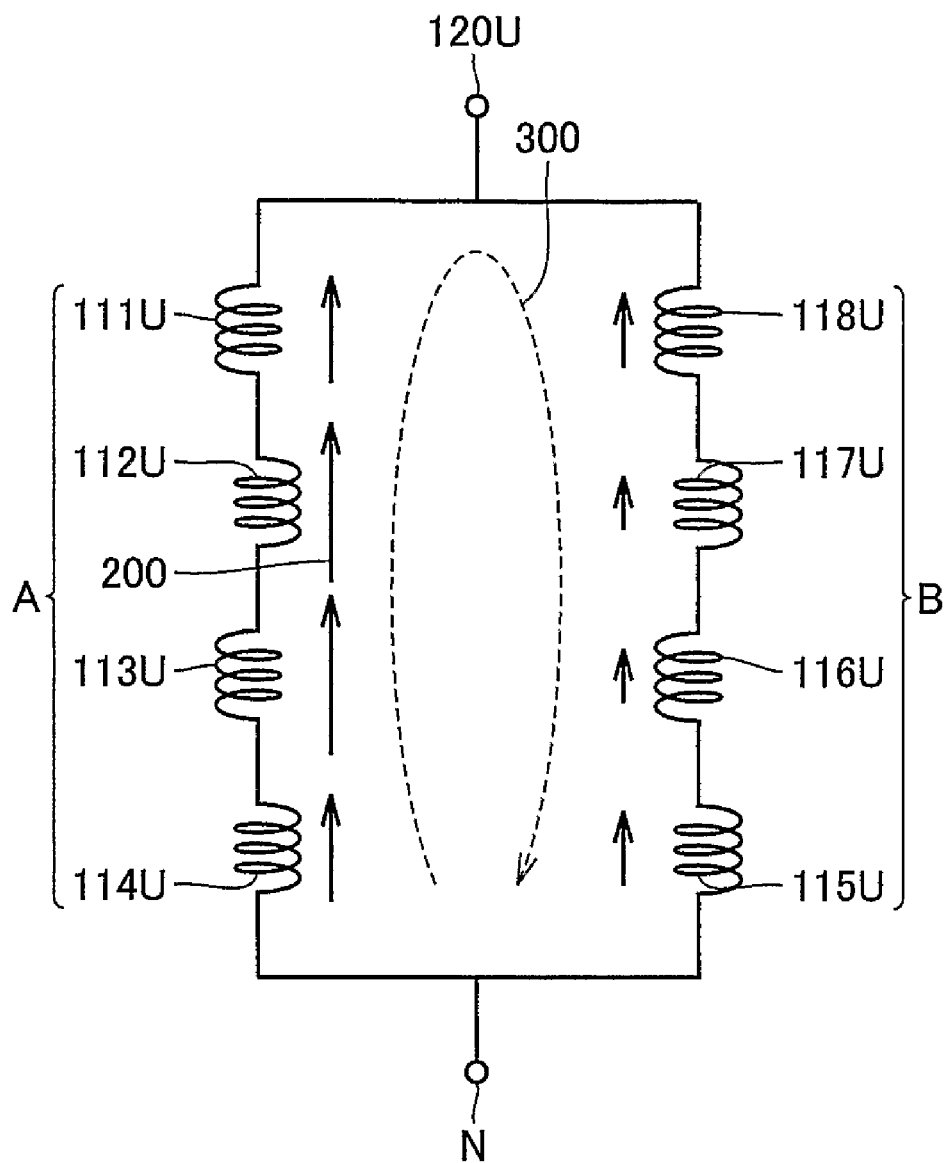
FIG. 9 is an equivalent circuit diagram showing the winding structure in FIG. 8.

FIG. 8 schematically shows another winding structure to be compared with the winding structure shown in FIG. 4. FIG. 9 is an equivalent circuit diagram showing the winding structure in FIG. 8. Referring to FIGS. 8 and 9, the winding structure in the present comparative example is basically similar to the winding structure shown in FIGS. 6 and 7 while different in the state of connection of U phase coils 111U to 118U. Specifically, in the present comparative example, a group of a plurality of series-connected U phase coils 111U to 114U (series coil A) and a group of a plurality of series-connected U phase coils 115U to 118U (series coil B) are connected in parallel.

Regarding the winding structure of the present comparative example, in the case as shown in FIG. 8 where rotor 2 is provided eccentrically with respect to stator 1, there arises a state in which the sum of electromotive forces 200 of U phase coils 111U to 114U (series coil A) does not balance with the sum of electromotive forces 200 of U phase coils 115U to 118U (series coil B) as shown in FIG. 9. As a result, cyclic current 300 is generated that flows in the parallel circuit comprised of the two sets of series coils. Accordingly, there arises a difference in electric current between circuits of three phases and a harmonic component of 2f (f: electrical frequency) is generated in magnetomotive force. Consequently, the force exerted on stator 1 could vary to cause vibrations and noise to increase while the rotating electric machine is driven.

For example, a hybrid vehicle with a rotating electric machine mounted thereon has a mode of stopping the engine while the vehicle is running (for example, EV drive mode in which the vehicle running at low speed is driven by the rotating electric machine to which electric power is supplied from a storage mechanism, regenerative mode in which kinetic energy of the vehicle is converted into electrical energy to be accumulated in the storage mechanism while the vehicle is decelerated). In such a mode, background noise is low and thus such noises as gear noise and motor noise are relatively easy to be heard. Therefore, it is important to suppress noise that could be generated while the rotating electric machine is driven. Further, in some cases, when the rotating electric machine is to be mounted on the vehicle, any restrictions on space and weight impose restrictions on the employment of measures for addressing noise of transmission and resonance systems. For this reason as well, it is important to suppress noise while the rotating electric machine is driven, and simultaneously meet such restricting conditions.

In terms of efficient achievement of high output and high torque, it is preferable that the gap between stator 1 and rotor 2 is set to be as small as possible. However, in the case where the gap is set to be small, even small eccentricity could have a great influence on the gap between the stator and rotor, which is likely to result in large vibratory force. Further, in terms of convenience of manufacture, it is difficult to set the degree of eccentricity between stator 1 and rotor 2 to the degree that generates no cyclic current 300 in the winding structure shown in FIGS. 8 and 9. In the case where a control system is used to try to suppress the imbalance in electric current due to the eccentricity, such a system would be a complicated one.

In contrast, in the winding structure shown in FIGS. 6 and 7, the first coil group and the second coil group each have one coil set and the other coil set spaced apart in the circumferential direction of stator core 100 while opposite to each other in the radial direction of stator core 100, as described above. Thus, even if stator 1 and rotor 2 are arranged eccentrically with respect to each other, the electromagnetic balance is kept (FIG. 7) and generation of cyclic current in the parallel circuit is suppressed. In this way, vibrations and noise that could occur while the rotating electric machine is driven are suppressed. Moreover, any loss that could be generated while the rotating electric machine is driven is reduced and thus the operation efficiency is improved.

Thus, with the winding structure shown in FIGS. 6 and 7, vibrations and noise while the rotating electric machine is driven can be reduced. However, as compared with the winding structure shown in FIGS. 8 and 9, in the winding structure shown in FIGS. 6 and 7, the coil-to-coil wire connecting a plurality of coils to each other tends to be longer. The longer coil-to-coil wire could be disadvantageous in some cases in terms of, for example, downsizing of the rotating electric machine, ensured electrical insulation of the winding, and improvement in productivity of the rotating electric machine.

In contrast, according to the present embodiment as shown in FIGS. 4 and 5, a part of the wire (coil-to-coil wire) connecting U phase coils 112U and 115U to each other is wound around the same teeth as those for U phase coil 113U1 to form U phase coil 113U2, and a part of the wire connecting U phase coils 114U and 117U to each other is wound around the same teeth as those for U phase coil 116U1 to form U phase coil 116U2. Thus, U phase coil 113U is comprised of U phase coils 113U1 and 113U2 while U phase coil 116U is comprised of U phase coil 116U1 and U phase coil 116U2.

Accordingly, the coil-to-coil wire is used as a part of coil turns and passed in a slot. Thus, the coil end of stator 1 is downsized. Further, deterioration in electrical insulation, due to exposure of a long coil-to-coil wire on the end surfaces in the axial direction of stator core, is suppressed. Furthermore, the shortened coil-to-coil wire improves productivity.

An example of the number of turns (turns) of U phase coils 111U to 118U each is shown in Table 1.

TABLE 1

| | 111U | 112U | 113U1 | 113U2 | 114U | 115U | 116U1 | 116U2 | 117U | 118U |
|---|---|---|---|---|---|---|---|---|---|---|
| turns* | N | N | N − M | M | N | N | N − M | M | N | N |

*number of turns

Here, the number of turns of U phase coils 113U2, 116U2 can appropriately be changed. Typically this number of turns is M=1. Even if the number of turns is M=1, the advantages that are downsizing of the rotating electric machine, ensured electrical insulation and improved productivity as described above, can sufficiently be obtained.

Preferably, the number of turns of U phase coil 113U2 is at most a half of the number of turns of coils 111U, 112U, 114U, 115U, 117U, 118U (namely M≦N/2). In other words, the number of turns of U phase coil 113U2 is preferably equal to or less than the number of turns of U phase coil 113U1.

Preferably, the number of turns of U phase coil 116U2 is at most a half of the number of turns of coils 111U, 112U, 114U, 115U, 117U, 118U (namely M≦N/2). In other words, the number of turns of U phase coil 116U2 is preferably equal to or less than the number of turns of U phase coil 116U1.

In this way, the winding structure can be obtained that is electromagnetically similar to the winding structure shown in FIGS. 6 and 7. Deterioration in electromagnetic balance of the winding structure can be suppressed while the winding structure can be reduced in size.

The above-described details are summarized as follows. A winding structure in the present embodiment includes stator core 100 having teeth (teeth 100A-100E for example) and stator winding 110 wound around the teeth of stator core 100. The stator winding 110 has a series coil A and a series coil B. Series coil A and series coil B are connected in parallel. Series coil A includes U phase coils 111U, 112U, 115U, 116U1 connected in series, and series coil B includes U phase coils 113U1, 114U, 117U, 118U connected in series. A part of a wire connecting U phase coils 112U, 115U of series coil A to each other is wound around the same teeth as those around which U phase coil 113U1 is wound to form U phase coil 113U2. A part of a wire connecting U phase coils 114U, 117U of series coil B is wound around the same teeth as those around which U phase coil 116U1 is wound to form U phase coil 116U2.

In the structure as described above, a part of the coil-to-coil wire connecting a plurality of coils is wound around teeth and accordingly the coil end is reduced in size.

While the present embodiment has been described in connection with the U phase coils, it would clearly be seen that the same idea and concept are applicable to V and W phase coils.

Although the present invention has been described and illustrated in detail, it is clearly understood that the same is by way of illustration and example only and is not to be taken by way of limitation, the spirit and scope of the present invention being limited only by the terms of the appended claims.

INDUSTRIAL APPLICABILITY

As seen from the description above, the present invention is applied to a winding structure of a rotating electric machine.

The invention claimed is:

1. A winding structure of a rotating electric machine, comprising:
  a core body having teeth; and
  a winding portion wound around the teeth of said core body, wherein
  said winding portion has a first coil group and a second coil group,
  said first coil group and said second coil group are connected in parallel,
  said first coil group includes a plurality of first coils connected in series,
  said second coil group includes a plurality of second coils connected in series,
  one of said first coils being wound around the same tooth as those around which one of said second coils is wound, and
  the sum of the number of turns of said one of said first coils and the number of turns of said one of said second coils that are wound around the same tooth is equal to the number of turns of each of said second coils which are wound around teeth other than those around which said first coils are wound.

2. The winding structure of a rotating electric machine according to claim 1, including said winding portion of a plurality of phases formed with displacement therebetween in the circumferential direction of said core body.

3. The winding structure of a rotating electric machine according to claim 1, wherein the number of turns of said one of said first coils is less than the number of turns of said one of said second coils.

4. The winding structure of a rotating electric machine according to claim 1, wherein the number of turns of said one of said first coils is equal to the number of turns of said one of said second coils.

* * * * *